No. 655,139. Patented July 31, 1900.
S. T. & C. H. WELLMAN & J. W. SEAVER.
OPEN HEARTH FURNACE.
(Application filed Oct. 24, 1898.)
(No Model.) 5 Sheets—Sheet 1.

No. 655,139. Patented July 31, 1900.
S. T. & C. H. WELLMAN & J. W. SEAVER.
OPEN HEARTH FURNACE.
(Application filed Oct. 24, 1898.)

(No Model.) 5 Sheets—Sheet 2.

Witnesses:—

Inventors:—
Samuel T. Wellman
Charles H. Wellman
John W. Seaver
by their Attorneys No. 655,139. Patented July 31, 1900.
S. T. & C. H. WELLMAN & J. W. SEAVER.
OPEN HEARTH FURNACE.
(Application filed Oct. 24, 1898.)
(No Model.) 5 Sheets—Sheet 4.

Witnesses:—
Louis M. F. Whitehead.
J. E. Bechtold.

Inventors:—
Samuel T. Wellman.
Charles H. Wellman.
John W. Seaver.
by their Attorneys:
Howson & Howson No. 655,139. Patented July 31, 1900.
S. T. & C. H. WELLMAN & J. W. SEAVER.
OPEN HEARTH FURNACE.
(Application filed Oct. 24, 1898.)
(No Model.) 5 Sheets—Sheet 5.
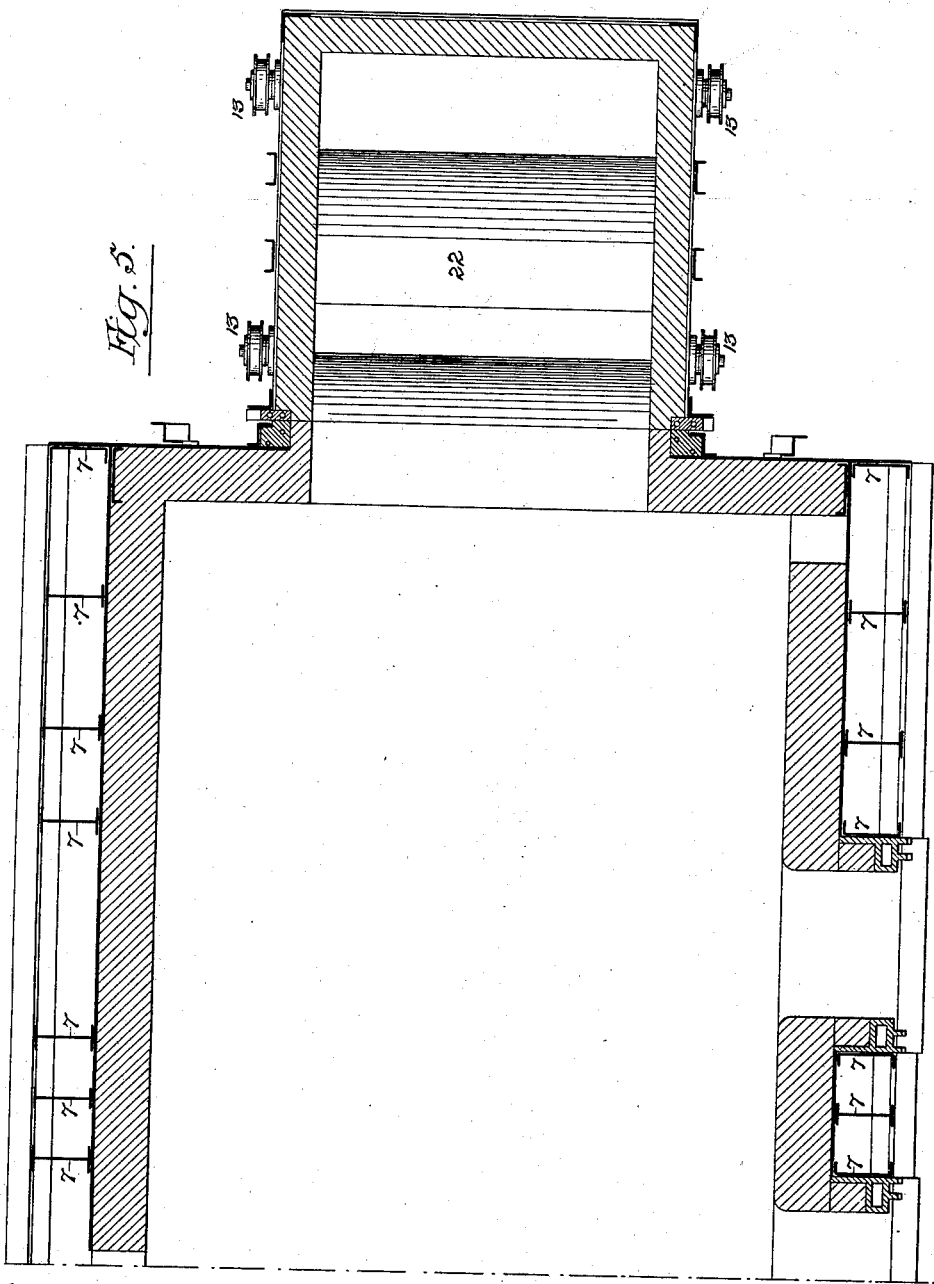

UNITED STATES PATENT OFFICE.

SAMUEL T. WELLMAN, CHARLES H. WELLMAN, AND JOHN W. SEAVER, OF CLEVELAND, OHIO.

OPEN-HEARTH FURNACE.

SPECIFICATION forming part of Letters Patent No. 655,139, dated July 31, 1900.

Application filed October 24, 1898. Serial No. 694,444. (No model.)

*To all whom it may concern:*

Be it known that we, SAMUEL T. WELLMAN, CHARLES H. WELLMAN, and JOHN W. SEAVER, citizens of the United States, residing at Cleveland, Ohio, have invented certain Improvements in Open-Hearth Furnaces, of which the following is a specification.

The object of our invention is to so construct an open-hearth furnace as to materially increase the strength and durability of the same as compared with present constructions. This object we attain in the manner hereinafter set forth, reference being had to the accompanying drawings, in which—

Figure 1:
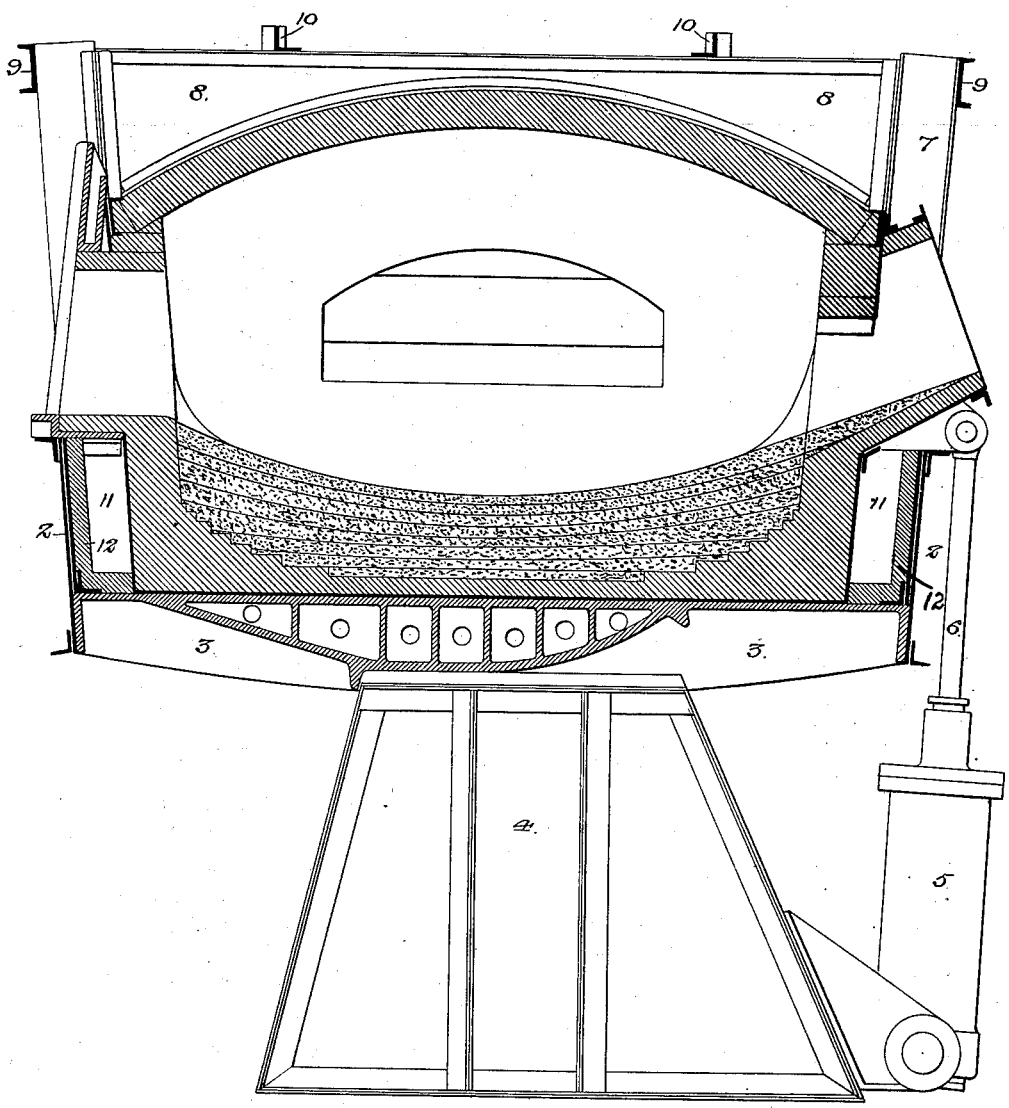
Figure 2:
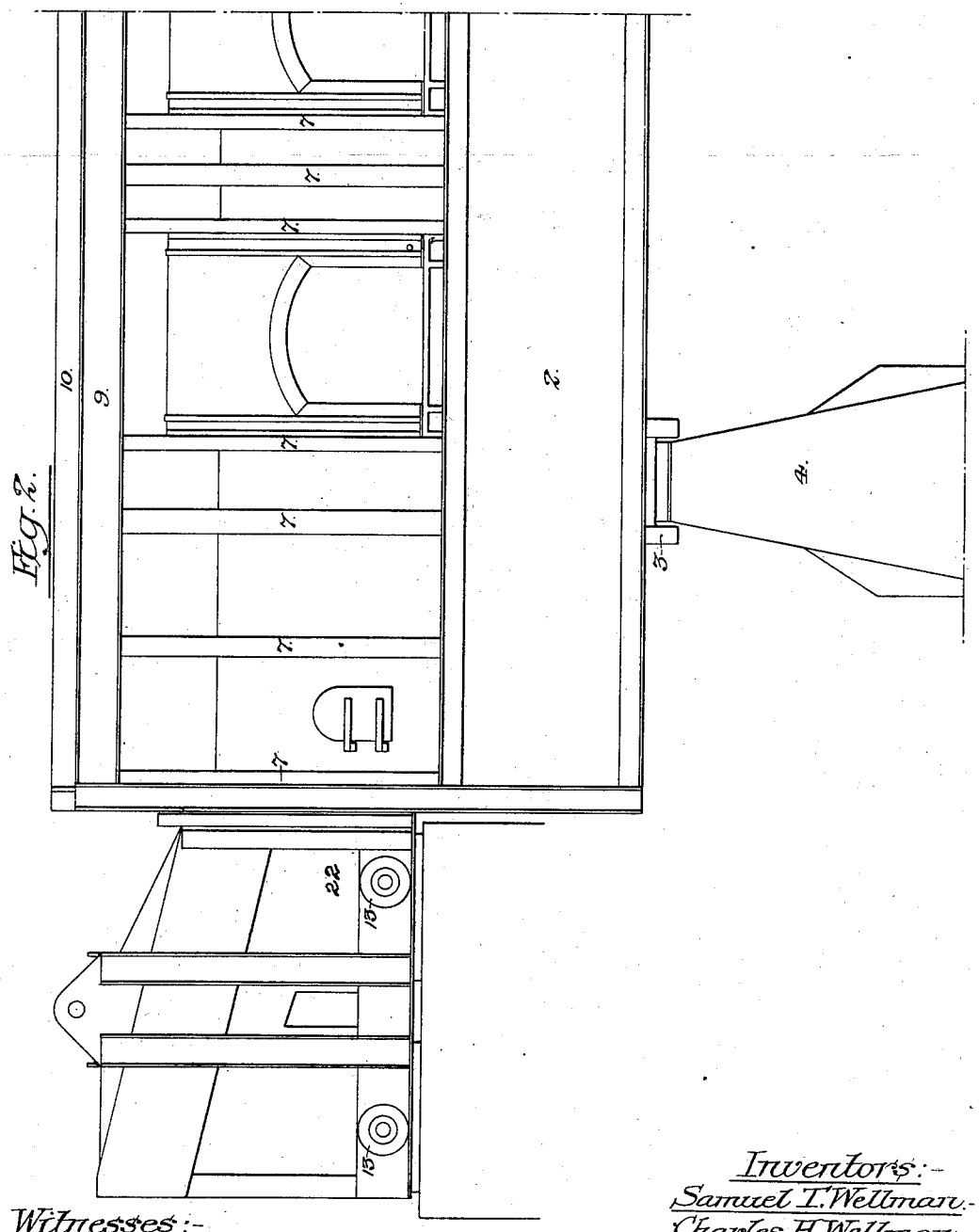
Figure 3:
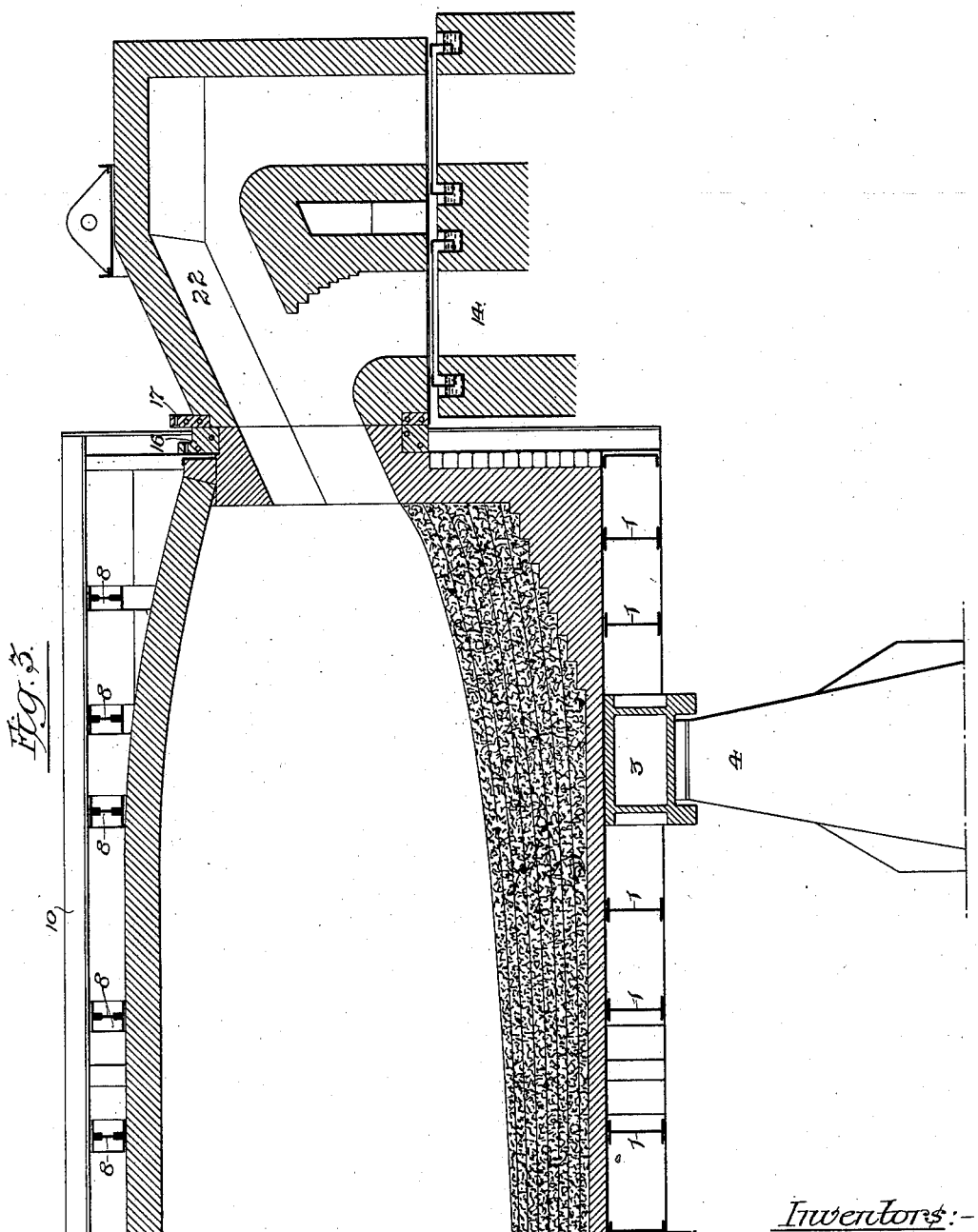
Figure 4:
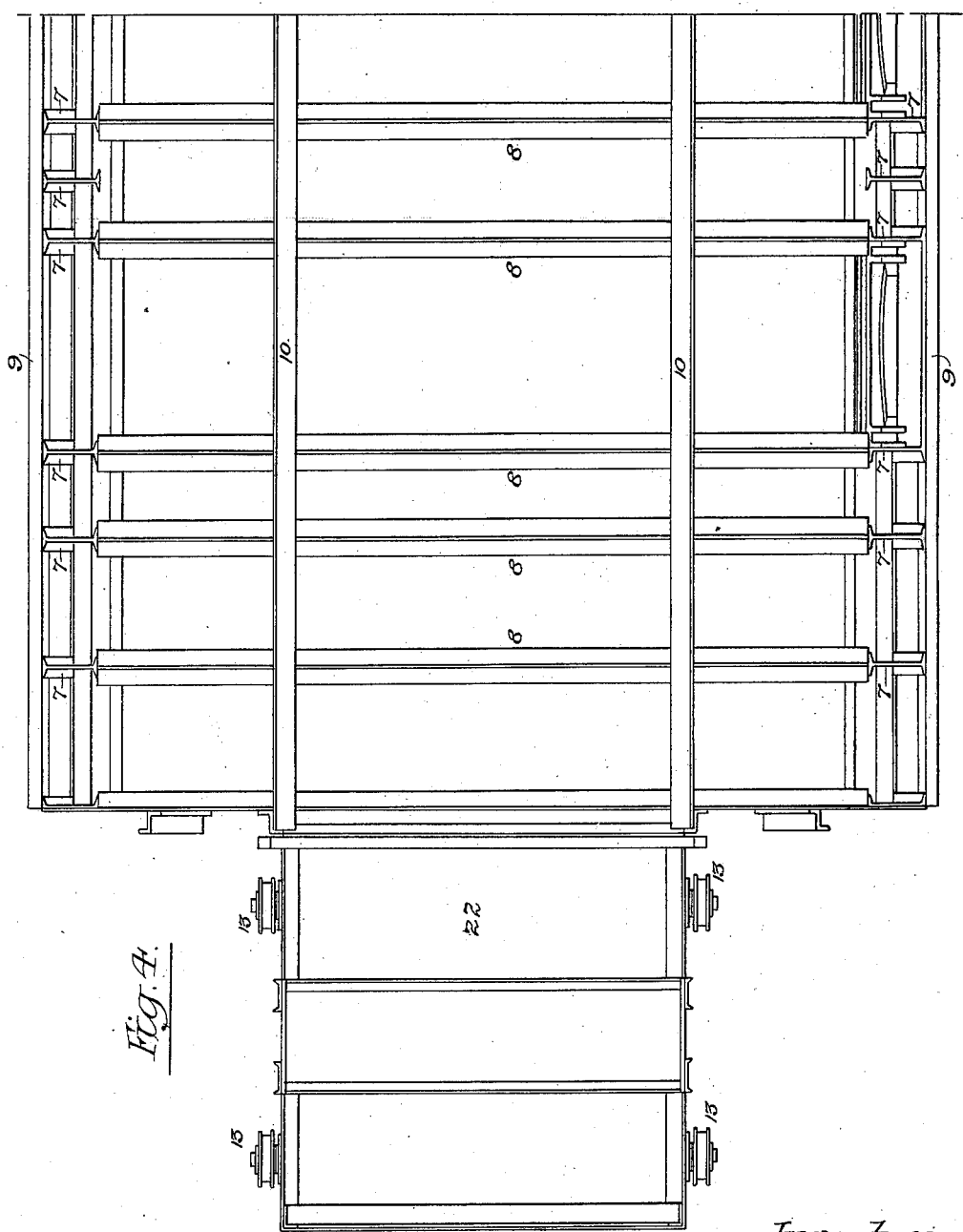

Figure 1 is a transverse section of an open-hearth furnace constructed in accordance with our invention. Fig. 2 is a side elevation of one half of the furnace. Fig. 3 is a longitudinal section of the other half of the furnace. Fig. 4 is a plan or top view of one half of the furnace, and Fig. 5 is a sectional plan of the other half of the furnace.

The metallic shell of the furnace consists of a box or tank the cross-sectional form of which is trapezoidal—that is to say, the tank is wider at the top than at the bottom, the sides having a slight outward flare from bottom to top. This tank is lined with fire-brick or other refractory material, as usual, and has an ordinary acid or basic bottom for action upon the metal contained in the furnace, the roof being arched transversely, as shown in Fig. 1, and also, by preference, arched slightly at each end, as shown in Fig. 3. The bottom of the tank rests upon transverse beams 1, disposed at suitable distances apart throughout the length of the furnace and secured at their opposite ends to longitudinal girders 2, which extend throughout the length of the furnace and are secured to and upheld by transverse supporting structures 3, which, as shown in the drawings, are composed of heavy castings, preferably of steel, as many of these supporting structures being employed as the size and weight of the furnace may suggest, two being employed in the furnace shown in the drawings and each of them presenting a convex under surface, so that it can rock upon its supporting-pedestal 4 in order to permit of the tipping or tilting of the furnace for the purpose of discharging its contents through the usual pouring-spout. In the furnace shown in the drawings this tipping or tilting operation is effected by means of hydraulic cylinders 5, one of which is pivoted to each of the pedestals and has a piston with rod 6, connected to suitable brackets on the furnace-casing; but other means of tipping the furnace may be adopted or the furnace may, if desired, be a fixed structure having castings 3 rigidly mounted upon their pedestals.

The sides of the furnace-casing are braced and stiffened by means of buckstaves 7, composed of ordinary I-beams or channels and so disposed throughout the length of the furnace as to impart the desired degree of strength thereto, the upper portions of the buckstaves on opposite sides of the furnace being connected by transverse beams 8, which as to their under faces conform to the arched top of the furnace, as shown in Fig. 1, so that they not only serve to connect the opposite buckstaves together, but also to stiffen and strengthen the arched top of the furnace and prevent the same from losing its proper shape or being destroyed by the action of the heat, tending to force upward the crown of the arch. The buckstaves 7 are connected together at the top by external longitudinal channel-bars 9, and the transverse braces 8 are also connected by means of longitudinal angles 10, so as to increase the stiffness and rigidity of the furnace-carrying structure.

By reason of the outwardly-flaring form of the sides of the furnace structure the lateral dimensions of the furnace are increased from bottom to top with corresponding increase of capacity, and the buckstaves support the furnace more effectively than they would if they were vertical, and a more effective anchorage for the arched top of the furnace is secured.

The buckstaves 7, interposed between the furnace-shell and the girders 2, serve to form air-spaces 11 between said furnace-shell and the girders, which air-spaces serve to protect the girders in a measure from the heat of the furnace, this object being further attained by providing the girders with linings 12, of suitable refractory material. These air-spaces also add greatly to safety of the longitudinal girders in the event of a burn out of the furnace-bottom, which would permit escape of the molten metal from the furnace.

It will be observed that the entire weight of the furnace is borne by the transverse supports 3, their supporting function being transmitted to the bottom girders 1 and buckstaves 7, through the medium of the longitudinal girders 2, thus providing an extremely strong, rigid, and durable metallic supporting structure for the furnace.

As shown in the drawings, the furnace is provided at each end with a movable flue-structure 22, having rollers 13, mounted upon suitable rails upon the fixed flue structure 14 at the ends of the furnace, so that the said movable flue structures can be drawn back out of contact with the ends of the furnace when it is desired to tip or tilt the same, suitable water-cooled frames or casings 16 and 17 serving to prevent such heating of the meeting portions of the furnace and flue structure as would cause the refractory material to fuse together.

The joints between the flues in the fixed flue structure 14 and those in the movable flue structure 22 are closed by water seals of such character as not to interfere with the desired movement of the flue structure 22.

The mode of constructing and mounting the movable flue structures, however, forms no part of our present invention.

Having thus described our invention, we claim and desire to secure by Letters Patent—

1. An open-hearth furnace having at the base transverse structures resting upon the furnace-supports, longitudinal side girders connected to the ends of said supporting structures, transverse base-beams alternating with the supporting structures but not resting upon the supports, and upright buckstaves at the sides of the furnace, said buckstaves and base-beams being secured to the longitudinal side girders whereby the latter serve as the mediums for conveying the weight of the furnace to the transverse supporting structures, substantially as specified.

2. An open-hearth furnace having at the base transverse structures resting upon the furnace-supports, longitudinal side girders connected to the ends of said supporting structures, transverse base-beams alternating with the supporting structures but not resting on the supports, upright buckstaves at the sides of the furnace, said buckstaves and base-beams being secured to the longitudinal side girders, and transverse stay-beams connecting portions of opposite buckstaves which project above the roof of the furnace, substantially as specified.

3. An open-hearth furnace having a roof arched transversely to the length of the furnace, buckstaves at opposite sides of the furnace projecting above the arched roof thereof, and transverse braces connecting said projecting portions of said buckstaves, said transverse braces having concaved under faces which conform to, and have a bearing upon, the transversely-arched roof, and serve to retain the same in shape, substantially as specified.

4. An open-hearth furnace having transverse supports, intervening transverse base-beams, upright buckstaves at the sides of the furnace, and longitudinal side girders serving to connect said transverse supports to the base-beams and buckstaves, said transverse supports having convex under faces mounted upon fixed pedestals so as to permit of the tipping or tilting of the furnace, substantially as specified.

5. An open-hearth furnace having transverse base-girders and supports, upright buckstaves at the sides, deep longitudinal plate-girders secured to the outer sides of said buckstaves, and also to the base structure of the furnace, so that air-spaces intervene between said girders and the furnace shell or casing, and a refractory lining for said air-spaces, whereby the deep plate-girder is protected from the heat of the furnace, substantially as specified.

In testimony whereof we have signed our names to this specification in the presence of two subscribing witnesses.

SAMUEL T. WELLMAN.
CHARLES H. WELLMAN.
JOHN W. SEAVER.

Witnesses:
C. W. COMSTOCK,
JOHN M. GEORGE.